US008662050B2

(12) United States Patent
Rabhi et al.

(10) Patent No.: US 8,662,050 B2
(45) Date of Patent: Mar. 4, 2014

(54) ELASTIC FIXING FOR A PISTON OF A VARIABLE COMPRESSION RATIO ENGINE

(75) Inventors: Vianney Rabhi, Lyons (FR); Sylvain Bigot, Lyons (FR)

(73) Assignees: MCE 5 Development, Lyons (FR); Vianney Rabhi, Lyons (FR)

( * ) Notice: Subject to any disclaimer, the term of this patent is extended or adjusted under 35 U.S.C. 154(b) by 470 days.

(21) Appl. No.: 13/111,232

(22) Filed: May 19, 2011

(65) Prior Publication Data

US 2011/0283969 A1    Nov. 24, 2011

Related U.S. Application Data

(60) Provisional application No. 61/346,685, filed on May 20, 2010.

(30) Foreign Application Priority Data

May 19, 2010    (FR) ...................................... 10 02103

(51) Int. Cl.
    *F02B 75/32*    (2006.01)
(52) U.S. Cl.
    USPC .................. 123/197.4; 123/48 B; 123/196 R; 123/197.1; 123/78 E; 123/78 BA
(58) Field of Classification Search
    USPC ............ 123/197.4, 48 B, 196 R, 197.1, 78 E, 123/78 BA
    See application file for complete search history.

(56) References Cited

U.S. PATENT DOCUMENTS

| 1,567,172 | A | * | 12/1925 | Powell | ............................... 74/29 |
| 6,354,252 | B1 | | 3/2002 | Rabhi | |
| 6,601,551 | B1 | * | 8/2003 | Rabhi | .......................... 123/78 E |
| 7,013,849 | B2 | * | 3/2006 | Rabhi | .......................... 123/48 B |
| 7,441,530 | B2 | * | 10/2008 | Tinker | ........................ 123/197.4 |

FOREIGN PATENT DOCUMENTS

| WO | 98/51911 A1 | 11/1998 |
| WO | 00/31377 A1 | 6/2000 |
| WO | 03/008783 A1 | 1/2003 |

* cited by examiner

*Primary Examiner* — Marguerite McMahon
*Assistant Examiner* — James Kim
(74) *Attorney, Agent, or Firm* — Young & Thompson

(57) ABSTRACT

The elastic fixing for a piston (2) of a variable compression ratio engine (10) includes at least one metal rod (15) kept under tension between the piston (2) and the transmission member (3) and which applies a strong contact pressure between the base of the piston (2) and the top face of the transmission member (3), the piston (2) being tightened according to a previously calculated angle enabling the metal rod (15) consisting of a stud (16) to be subjected to a desired tension force and the tightening prestress to be reached between the piston (2) and the transmission member (3), and indexed in rotation relative to the transmission member (3), by an additional tightening which does not significantly increase the tightening pre-stress, the stud (16) continuing to elongate with the same tension force by plastic deformation.

10 Claims, 3 Drawing Sheets

ELASTIC FIXING FOR A PISTON OF A VARIABLE COMPRESSION RATIO ENGINE

The subject of the present invention is an elastic fixing for a piston of a variable compression ratio engine that makes it possible to maintain the tightness and/or the indexing in rotation of said piston relative to a transmission member.

Various mechanical devices for engines with variable cubic inch displacement are known, from the international patents WO 98/51911, WO 00/31377, WO 03/008783 belonging to the applicant.

It will be noted that the international patent WO 98/51911 in the name of the applicant describes a device that is used to improve the overall efficiency of internal combustion engines with pistons used at variable load and speed by adaptation, while running, of their effective cubic inch displacement and/or their compression ratio. This type of engine is also known by those skilled in the art by the name of "variable compression ratio engine", this designation being retained in the text hereinbelow.

It will be observed that, according to the international patent WO 00/31377 in the name of the applicant, the mechanical transmission device for variable compression ratio engine comprises a piston securely attached in its bottom part to a transmission member cooperating on the one hand with a guiding device with rolling bearing, and on the other hand with a toothed wheel securely attached to a link rod enabling the movement to be transmitted between said piston and said link rod.

It will be noted that, according to the international patent WO 03/008783 in the name of the applicant, the mechanical transmission device for variable compression ratio engine comprises at least one cylinder in which is displaced a piston which is securely attached, in its bottom part, to a transmission member cooperating on the one hand by means of a rack of small dimensions with a guiding device with rolling bearing, and on the other hand by means of another rack of large dimensions with a toothed wheel securely attached to a link rod. Said mechanical transmission device for variable compression ratio engine also comprises at least one control rack cooperating with the toothed wheel, means for fixing the piston to the transmission member which offer a tightening prestress, link means which make it possible to stiffen the teeth of the racks, and means for reinforcing and lightening the structure of the toothed wheel.

It will be seen that, according to the international patent WO 03/008783, the piston securely attached in its bottom part to a transmission member has a guiding skirt which ensures the centering of said piston in the cylinder of the variable compression ratio engine, whereas the guiding device with rolling bearing ensures the orientation of said piston in said cylinder.

It will be noted that, according to the international patent WO 00/31377 in the name of the applicant, the piston has a baseplate which is linked via a T-section link rod to a rack consisting of two half-racks by means of a clamping screw.

It will be noted that, according to the international patent WO 03/008783 in the name of the applicant, the rack previously consisting of two half-racks now consists of only a single piece and is renamed "transmission member".

Furthermore, this same patent describes another way of fixing the piston to its transmission member which consists of fixing means which offer a tightening prestress and ensure the centering of the piston on said transmission member.

These tightening means consist of a threaded bore produced in the supporting foot of the piston which cooperates with a threaded shaft securely attached to the transmission member.

Furthermore, according to this patent, the centering between the piston and the transmission member is ensured by a smooth bore produced in the supporting foot of the piston coaxially to the threaded bore, which cooperates with a smooth portion provided on the vertical shaft of the transmission member.

While the fixing method described in the international patent WO 03/008783 in the name of the applicant represents a significant advance over the international patent WO 00/31377, there is no solution which guarantees the absence of loosening of the piston from its transmission member.

Furthermore, no solution is proposed to ensure both the necessary tightening prestress between the piston and the transmission member, and the indexing in rotation of said piston.

In fact, said indexing is necessary to cope with the dentings of the valves produced on the crown of the piston and the valves, or to orient any bowl formed on the crown of the piston in relation to an injector housed in the cylinder head.

In fact, in order to check both the value of the tightening force and the indexing in rotation, it is necessary to index in rotation the threads produced both in the supporting foot of the piston and on the transmission member, while controlling their location. Such an indexing of the threads is difficult to envisage in mass production.

Another solution for simultaneously ensuring the tightening and the indexing in rotation of the piston relative to the transmission member would be to interpose a thickness washer between said piston and said transmission member.

In this case, the overall height of the piston/transmission member assembly becomes variable and it is necessary to take account of this variation in the initial setting of the compression ratio of the variable compression ratio engine. Furthermore, it is necessary to have washers of different thicknesses or make said washers by the unit. This constraint is also difficult to envisage in mass production.

Other problems are posed by the fixing of the piston to its transmission member as proposed in the international patent WO 03/008783.

Among these, it will be noted that the piston must, in most cases, be produced in an aluminum-based light alloy. This is necessary for said piston to be lightweight while guaranteeing an adequate thermal conductivity so as to remain sufficiently cold.

The problem with aluminum is on the one hand its low initial mechanical strength which in addition deteriorates rapidly when hot, and on the other hand its coefficient of expansion which is greater than that of steel. These two points result in the gradual loosening of the piston from the transmission member to which it is fixed, by creep and by plastic deformation of the threading produced in the supporting foot of said piston.

Once said assembly becomes loosened, the tightening stress sought between the piston and its transmission member is no longer ensured and an undesirable separation may occur at the level of the contact between the supporting foot of the piston and the top face of the transmission member.

This separation results in the upsetting of the bearing face of the piston and introduces a risk of rotation of said piston. If the piston rotates, said rotation may potentially be accompanied by the collision between said piston and the valves of the variable compression ratio engine, resulting in the partial destruction of the latter.

It is to resolve these various problems that the elastic fixing for a piston of the variable compression ratio engine according to the present invention provides:

for the provision of an adequate reserve of elasticity between the transmission member and the piston while using a fixing region on said piston placed in the coldest possible part of said piston;

for the provision of an adequate reserve of plasticity to make it possible—when tightening the piston on its transmission member—to index said piston in rotation, even when the tightening prestress has already been reached.

Thus, the elastic fixing for a piston of the variable compression ratio engine according to the present invention is distinguished from the prior art in that, according to a particular embodiment:

the risks of loosening of the piston are eliminated, as are the risks of collision between the piston and valves and the risks of premature destruction of the engine;

the need for indexing of the threads of the piston and of the transmission member is eliminated;

the need for shims or thickness washers interposed between the piston and the transmission member is eliminated;

the manufacture of the piston is simplified, the latter being able to be entirely machined before mounting and having only a single height dimension;

the mounting of the piston is simplified, with indexing facilitated for said piston relative to the transmission member;

the compression ratio dispersions between two cylinders of one and the same engine are reduced because of an almost constant height of the piston/transmission member assembly.

The elastic fixing for a piston of a variable compression ratio engine, according to the present invention, consists of at least one metal rod kept under tension between said piston and said transmission member and which applies a strong contact pressure between the base of said piston and the top face of said transmission member, said piston being on the one hand tightened according to a previously calculated angle enabling the metal rod consisting of a stud to be subjected to a desired tension force and the tightening prestress to be reached between said piston and the transmission member and on the other hand indexed in rotation relative to the transmission member, by an additional tightening which does not significantly increase the tightening prestress, said stud continuing to elongate with the same tension force by plastic deformation.

The elastic fixing for a piston of a variable compression ratio engine, according to the present invention, comprises a metal rod which consists of a stud screwed at one of its ends directly or indirectly into the piston and at its other end into the top part of the transmission member.

The elastic fixing for a piston of a variable compression ratio engine, according to the present invention, comprises a stud that has a shoulder which bears on a surface produced on the top face of the transmission member, said shoulder limiting the length by which said stud is screwed into said transmission member.

The elastic fixing for a piston of a variable compression ratio engine, according to the present invention, comprises a stud that has a shoulder which bears on a surface produced inside the piston, said shoulder limiting the length by which said stud is screwed into said piston.

The elastic fixing for a piston of a variable compression ratio engine, according to the present invention, comprises a stud that has a constricted part in its middle.

The elastic fixing for a piston of a variable compression ratio engine, according to the present invention, comprises a stud which is screwed into the piston via a sleeve that has in its top part an internal thread into which the stud is screwed, said sleeve being screwed into the bottom part of the supporting foot of the piston by means of a thread formed on the outside of the bottom part of said sleeve which cooperates with an internal thread formed in said bottom part of the supporting foot, said sleeve not being in contact with the transmission member so as to leave a distance (d) between said sleeve and said member.

The elastic fixing for a piston of a variable compression ratio engine, according to the present invention, comprises a stud that has a shoulder which bears on a surface produced inside the sleeve, said shoulder limiting the length by which said stud is screwed into said sleeve.

The elastic fixing for a piston of a variable compression ratio engine, according to the present invention, comprises a sleeve that has a shoulder which bears on a surface produced inside the piston, said shoulder limiting the depth by which said sleeve is screwed into said piston.

The elastic fixing for a piston of a variable compression ratio engine, according to the present invention, comprises a stud and a sleeve which form only a single piece.

The elastic fixing for a piston of a variable compression ratio engine, according to the present invention, comprises an internal thread which has a direction of tightening which is the reverse of the direction of tightening of the external thread.

The following description in light of the appended drawings, given as nonlimiting examples, will make it possible to better understand the invention, the features that it offers and the advantages that it is likely to provide.

DESCRIPTION OF THE INVENTION

Figure 1:
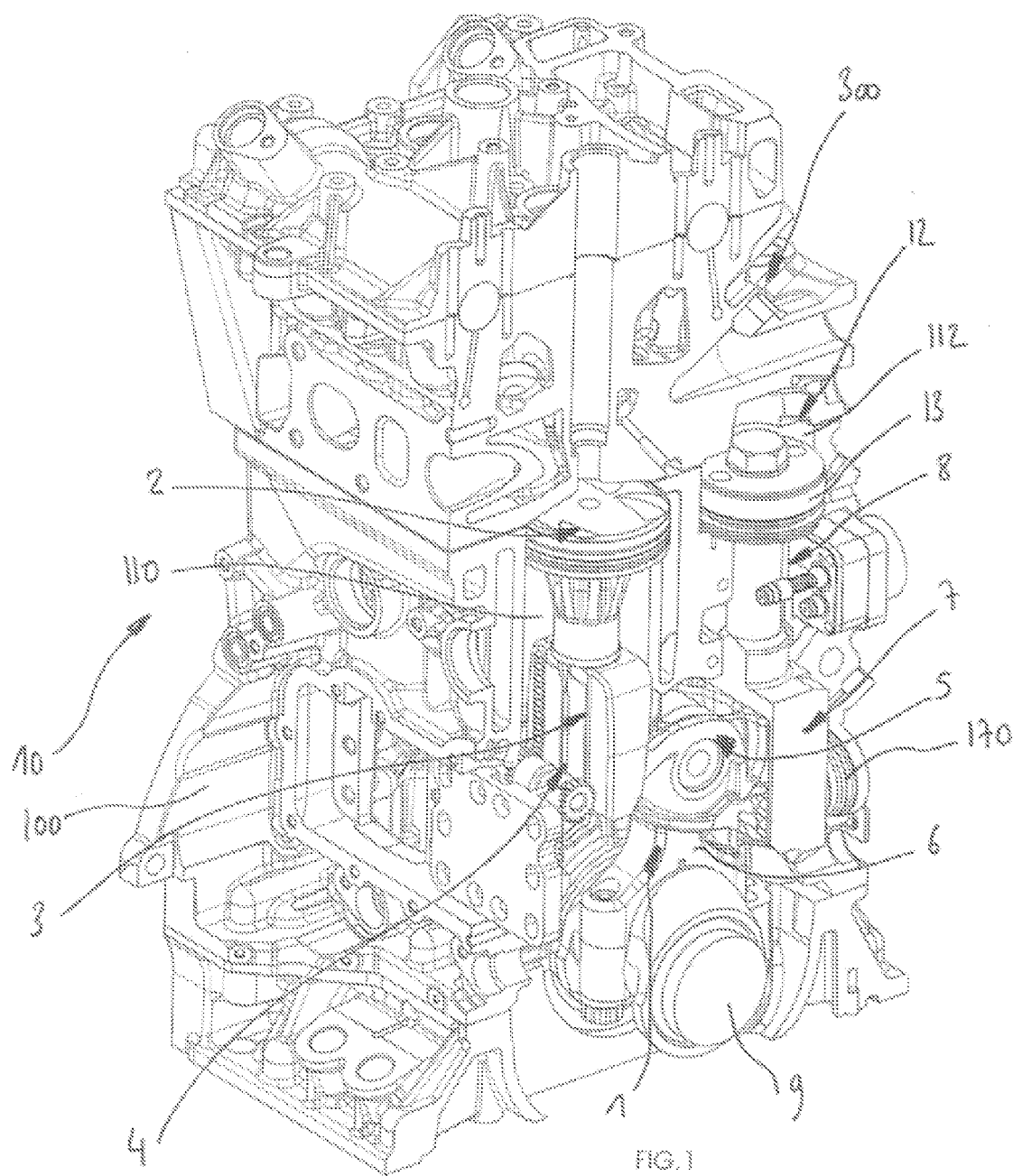
FIG. 1 is a perspective view illustrating the main components of a variable compression ratio engine in which each piston is securely attached to a transmission member via an elastic fixing for a piston according to the present invention.
Figure 2:
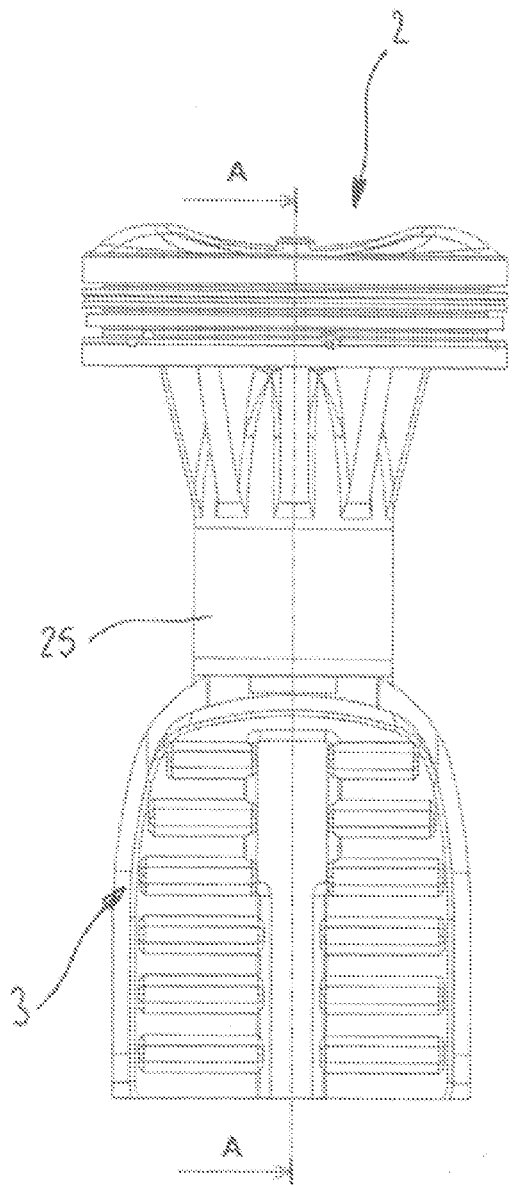
FIG. 2 is perspective view showing a piston securely attached to a transmission member by means of an elastic fixing for a piston of a variable compression ratio engine according to the present invention.

FIG. 1 shows an engine block or cylinder block 100 which comprises at least one cylinder 110 in which a combustion piston 2 is displaced by means of a transmission device 1 and pressure means 170 which make it possible to keep in position the main moving components of a variable compression ratio engine 10.

The mechanical transmission device 1 comprises in the bottom part of the combustion piston 2 a transmission member 3 securely attached to said piston and cooperating, on the one hand with a guiding device with rolling bearing 4, and on the other hand with a toothed wheel 5.

The toothed wheel 5 cooperates with a link rod 6 linked to a crank shaft 9 in order to reduce the transmission of the movement piston 2 and said link rod 6.

The toothed wheel 5 cooperates unlike the transmission member or piston rack 3 with another rack, called control rack 7, whose vertical position relative to the cylinder block 100 is controlled by a control device 12 comprising control jack 8, the jack piston 13 of which is guided in a jack cylinder 112 formed in the cylinder block 100 and sealed in its top part by a common cylinder head 300.

FIGS. 2 to 7 show different variant embodiments of the elastic fixing for a piston 2 of a variable compression ratio engine 10 according to the present invention.

The elastic fixing for a piston 2 of a variable compression ratio engine 10 consists of at least one metallic rod 15 which is kept under tension between said piston 2 and said transmission member 3. The metal rod 15 kept under tension between said piston 2 and said transmission member 3 makes it possible to apply a strong contact pressure between the base of said piston 2 and the top face of said transmission member 3.

The metal rod 15 consists of a stud 16 which is screwed at one of its ends directly or indirectly into the piston 2 and at its other end into the top part of the transmission member 3.

The length of the stud 16 provides a necessary reserve of elasticity to avoid any loosening of the assembly consisting of the piston 2 and the transmission member 3.

Figure 3:
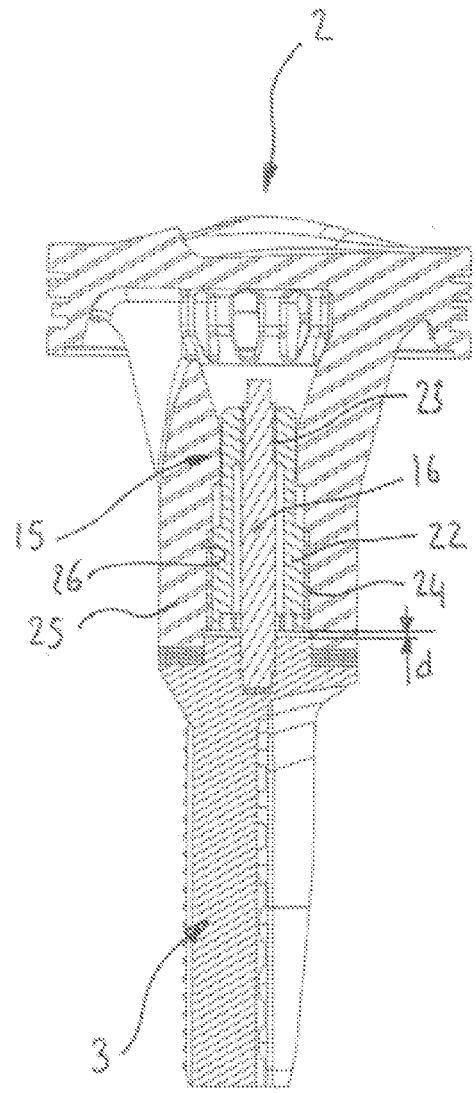
FIG. 3 is a cross-sectional view representing one embodiment of the elastic fixing for a piston of a variable compression ratio engine according to the invention.
Figure 6:
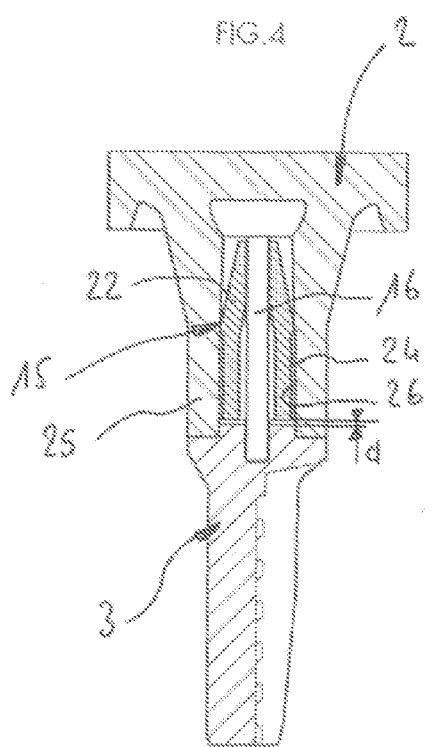

FIGS. 3 and 6 show an embodiment of the elastic fixing according to the present invention in which the stud 16 is screwed into the piston 2 via a sleeve 22 which has in its top part an internal thread 23 into which the stud 16 is screwed, said sleeve 22 being screwed into the bottom part of the supporting foot 25 of the piston 2 by means of an external thread 24 formed on the outside of the bottom part of said sleeve 22 which cooperates with an internal thread 26 formed in said bottom part of the supporting foot 25.

It will be noted that the sleeve 22 is not in contact with the transmission member 3 so as to leave a distance d between said sleeve 22 and said member 3.

According to one embodiment, the internal thread 23 has a direction of tightening which is the reverse of the direction of tightening of the external thread 24. As an example, if the internal thread 23 is right-handed, the external thread 24 is left-handed and vice versa.

According to this embodiment, the length of said sleeve 22 is added to that of the stud 16 to offer the necessary reserve of elasticity to avoid any loosening of the assembly consisting of the piston 2 and the transmission member 3 with which it cooperates.

It will be noted that the internal thread 26 formed in said bottom part of the supporting foot 25 of the piston 2 may be produced by forming, rolling or strain-hardening. Furthermore, and according to a particular embodiment, the sleeve 22 may offer a tool grip of any shape which facilitates the mounting of said sleeve in the piston 2.

The stud 16 has a shoulder which is not represented which bears on a surface produced inside the sleeve 22, said shoulder limiting the length by which said stud 16 is screwed into said sleeve 22.

Said shoulder may offer a tool grip of any shape which makes it possible to first screw said stud 16 into the sleeve 22 then screw said stud 16 into the transmission member 3 without risking said stud 16 continuing to be screwed into the sleeve 22 and not into the transmission member 3.

Figure 7:
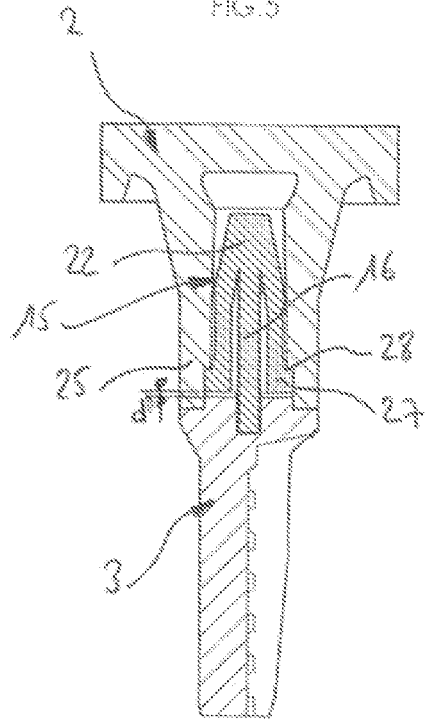

The sleeve 22 has a shoulder 27 which bears on a surface 28 produced inside the piston 2, said shoulder 27 limiting the depth by which said sleeve 22 is screwed into said piston 2 (FIG. 7). It will be noted that, in each embodiment of the elastic fixing according to the present invention comprising a sleeve 22, the latter may have a shoulder 27 which bears on a surface 28 produced inside the piston 2.

Figure 4:
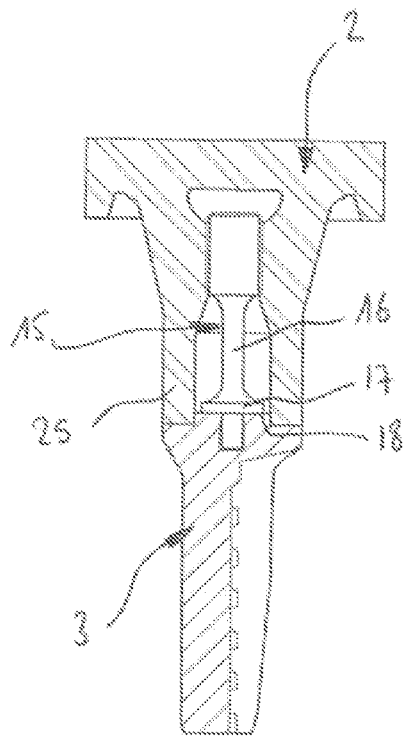
FIGS. 4 to 7 are cross-sectional views representing different variant embodiments of the elastic fixing for a piston of a variable compression ratio engine according to the present invention.

FIG. 4 shows a first variant embodiment of the elastic fixing according to the present invention in which the stud 16 constituting the metal rod 15 housing in its bottom part a shoulder 17 which bears on a surface 18 produced on the top face of the transmission member 3, said shoulder 17 limiting the length by which said stud 16 is screwed into said transmission member 3.

The shoulder 17 may offer a tool grip of any shape and make it possible to first screw the stud 16 into the transmission member 3 then screw said stud into the piston 2 without risking said stud 16 continuing to be screwed into said transmission member 3 and not into the piston 2.

It will be noted that the top part of the transmission member 3 may include a smooth portion ensuring the centering of the piston 2, similar to that already described in various patents belonging to the applicant.

Figure 5:
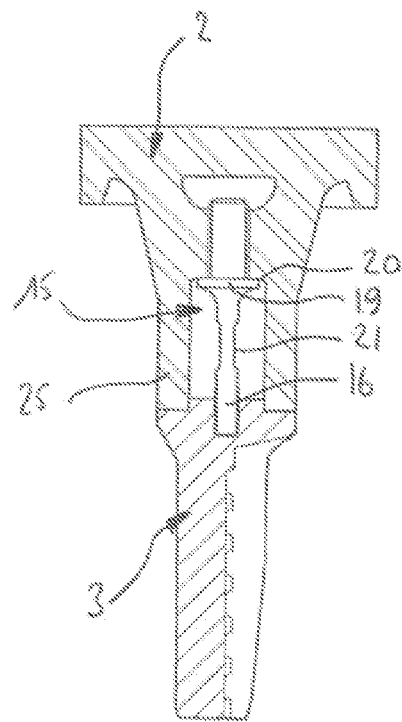

FIG. 5 shows a second variant embodiment of the elastic fixing according to the present invention in which the stud 16 constituting the metal rod 15 has in its top part a shoulder 19 which bears on a surface 20 produced inside the piston 2, said shoulder 19 limiting the length by which said stud 16 is screwed into said piston 2 (FIG. 5).

The shoulder 19 may offer a tool grip of any shape, said grip making it possible to first screw said stud 16 into the piston 2 then screw said stud 16 into the transmission member 3 without risking said stud 16 continuing to be screwed into said piston 2 and not into the transmission member 3.

The stud 16 may include a constricted part 21 in its middle making it possible, by calculating its section, to control the elasticity of said stud.

FIG. 7 shows a third variant embodiment of the elastic fixing according to the present invention in which the stud 16 is no longer screwed into the sleeve 22, but is produced in the same piece of metal, which results in the elimination of the threads produced on the stud 16 and in the sleeve 22 necessary for the assembly of these two pieces. Thus, the stud 16 and the sleeve 22 are produced in a single piece.

Another embodiment consists in producing the sleeve 22 and the stud 16 separately, and in assembling them, no longer by screwing, but, for example, by banding, fastening or any other assembly method known to those skilled in the art.

Operation of the Invention

The elastic fixing for a piston 2 of a variable compression ratio engine 10 according to the invention and according to a particular embodiment illustrated in FIGS. 3 and 6 is fitted as follows: the sleeve 22 is screwed into the supporting foot 25 of the piston 2, the stud 16 is screwed into the top part of the transmission member 3, then the stud 16, securely attached to the transmission member 3, is screwed by its other end into the top part of the sleeve 22 until the piston 2 comes into contact with the transmission member 3. The duly screwed stud 16, the piston 2 and the transmission member 3 are assembled.

Then, the piston 2 is tightened according to a previously calculated angle. Said angle makes it possible for the stud 16 to be subjected to the desired tension force and for the tightening prestress to be reached between said piston 2 and the transmission member 3. Then, the piston 2 is indexed in rotation relative to the transmission member 3, by additional tightening. This additional tightening does not significantly increase the tightening prestress, the stud 16 continuing to elongate at the same tension force by plastic deformation.

It should also be understood that the description above has been given only as an example and that it in no way limits the scope of the invention from which there will be no departure if the details of execution described are replaced with any other equivalent.

The invention claimed is:

1. An elastic fixing for a piston (2) of a variable compression ratio engine (10), said piston (2) being securely attached in its bottom part to a transmission member (3) which cooperates on the one hand with a guiding device with rolling bearing (4), and on the other hand with a toothed wheel (5) securely attached to a link rod (6) in order to ensure the transmission of the movement between said piston (2) and said link rod (6), characterized in that it consists of at least one metal rod (15) kept under tension between said piston (2) and said transmission member (3) and which applies a strong contact pressure between the base of said piston (2) and the top face of said transmission member (3), said piston (2) being on the one hand tightened according to a previously calculated angle enabling the metal rod (15) consisting of a stud (16) to be subjected to a desired tension force and the tightening prestress to be reached between said piston (2) and the transmission member (3) and on the other hand indexed in rotation relative to the transmission member (3), by an additional tightening which does not significantly increase the tightening prestress, said stud (16) continuing to elongate with the same tension force by plastic deformation.

2. The elastic fixing for a piston of a variable compression ratio engine as claimed in claim 1, characterized in that the metal rod (15) consists of a stud (16) screwed at one of its ends directly or indirectly into the piston (2) and at its other end into the top part of the transmission member (3).

3. The elastic fixing for a piston of a variable compression ratio engine as claimed in claim 2, characterized in that the stud (16) has a shoulder (17) which bears on a surface (18) produced on the top face of the transmission member (3), said shoulder (17) limiting the length by which said stud (16) is screwed into said transmission member (3).

4. The elastic fixing for a piston of a variable compression ratio engine as claimed in claim 2, characterized in that the stud (16) has a shoulder (19) which bears on a surface (20) produced inside the piston (2), said shoulder (19) limiting the length by which said stud (16) is screwed into said piston (2).

5. The elastic fixing for a piston of a variable compression ratio engine as claimed in claim 2, characterized in that the stud (16) has a constricted part (21) in its middle.

6. The elastic fixing for a piston of a variable compression ratio engine as claimed in claim 2, characterized in that the stud (16) is screwed into the piston (2) via a sleeve (22) that has in its top part an internal thread (23) into which said stud (16) is screwed, said sleeve (22) being screwed into the bottom part of a supporting foot (25) for the piston (2) by means of an external thread (24) formed on the outside of the bottom part of said sleeve (22) which cooperates with an internal thread (26) formed in said bottom part of the supporting foot (25), said sleeve (22) not being in contact with the transmission member (3) so as to leave a distance (d) between said sleeve (22) and said member (3).

7. The elastic fixing for a piston of a variable compression ratio engine as claimed in claim 6, characterized in that the stud (16) has a shoulder which bears on a surface produced inside the sleeve (22), said shoulder limiting the length by which said stud (16) is screwed into said sleeve (22).

8. The elastic fixing for a piston of a variable compression ratio engine as claimed in claim 6, characterized in that the sleeve (22) has a shoulder (27) which bears on a surface (28) produced inside the piston (2), said shoulder (27) limiting the depth by which said sleeve (22) is screwed into said piston (2).

9. The elastic fixing for a piston of a variable compression ratio engine as claimed in claim 6, characterized in that the stud (16) and the sleeve (22) are produced in a single piece.

10. The elastic fixing for a piston of a variable compression ratio engine as claimed in claim 6, characterized in that the internal thread (23) has a direction of tightening which is the reverse of the direction of tightening of the external thread (24).

* * * * *